United States Patent
Snyder et al.

[11] 3,722,957
[45] Mar. 27, 1973

[54] GAGE SCRAPER

[75] Inventors: Larry L. Snyder; James R. Matlack, both of Solon, Ohio

[73] Assignee: Jarva, Inc., Solon, Ohio

[22] Filed: Apr. 5, 1971

[21] Appl. No.: 130,982

[52] U.S. Cl. ............... 299/86, 175/313, 175/336
[51] Int. Cl. ........................ E01q 3/04, E21c 25/10
[58] Field of Search ..... 299/80, 85, 86; 175/313, 336

[56] References Cited

UNITED STATES PATENTS 3,583,503   6/1971   Coski ............................ 175/336 X Primary Examiner—Ernest R. Purser
Attorney—McNenny, Farrington, Pearne & Gordon

[57] ABSTRACT

A tunneling machine includes a support frame, a rotatable cutter head, and inside roller cutters and gage roller cutters for cutting or crushing the end face of a tunnel. Each gage cutter has a gage scraper with a scraper blade engaging the tunnel surface for clearing materials from the path of the gage cutter. A spring biases the scraper blade toward the tunnel surface, and the scraper blade is pivotally mounted with respect to the cutter head for movement toward and away from the tunnel surface along an arcuate path. A bolt head in the arcuate path provides an adjustable stop for preventing excessive outward travel of the scraper blade when a void is encountered in the tunnel surface. The bolt also provides a release means to displace the scraper blade away from the tunnel surface to permit removal of the scraper blade.

13 Claims, 5 Drawing Figures

Patented March 27, 1973
3,722,957
2 Sheets-Sheet 1
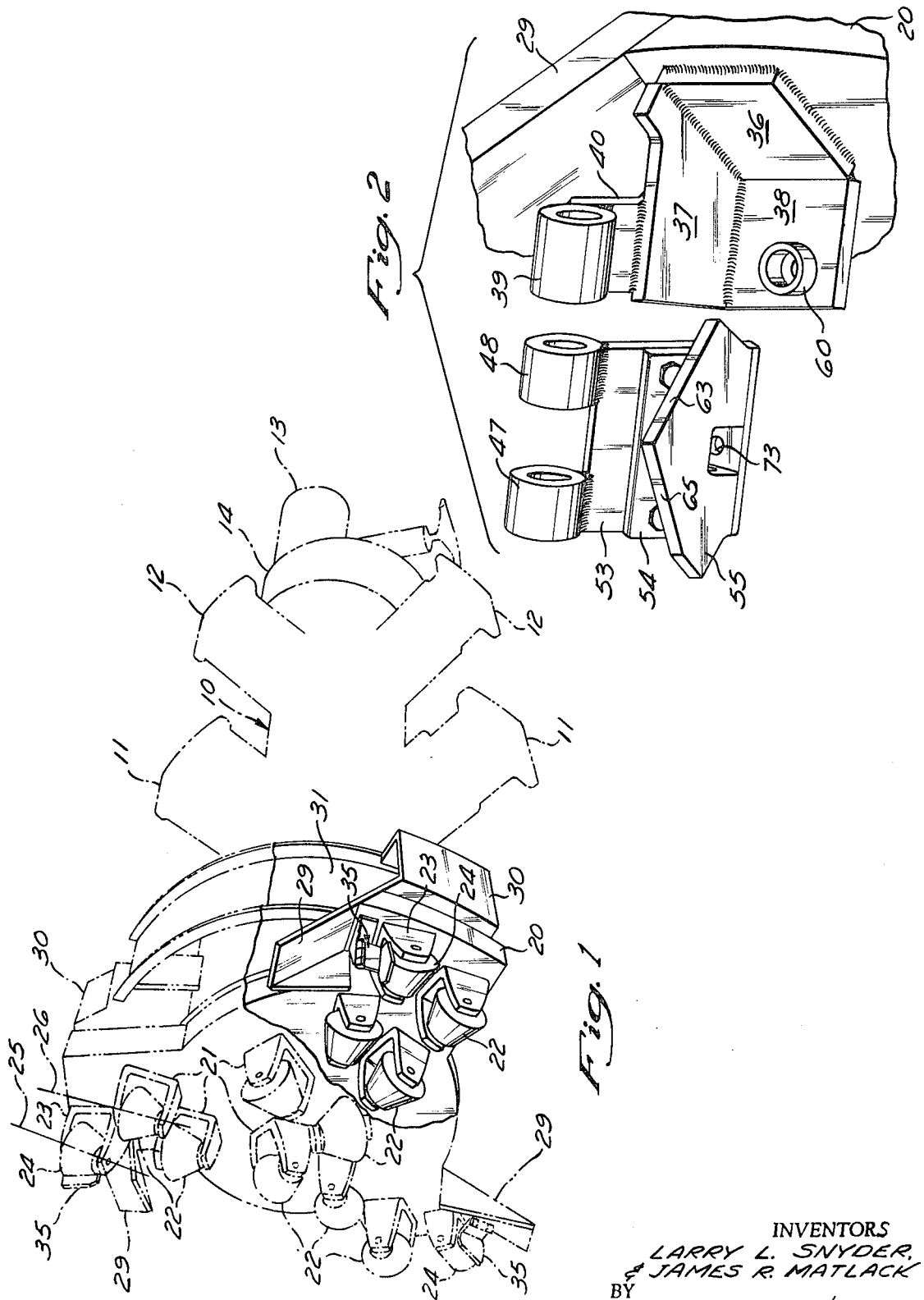
INVENTORS
LARRY L. SNYDER,
& JAMES R. MATLACK
BY
McNENNY, FARRINGTON, PEARNE & GORDON
ATTORNEYS

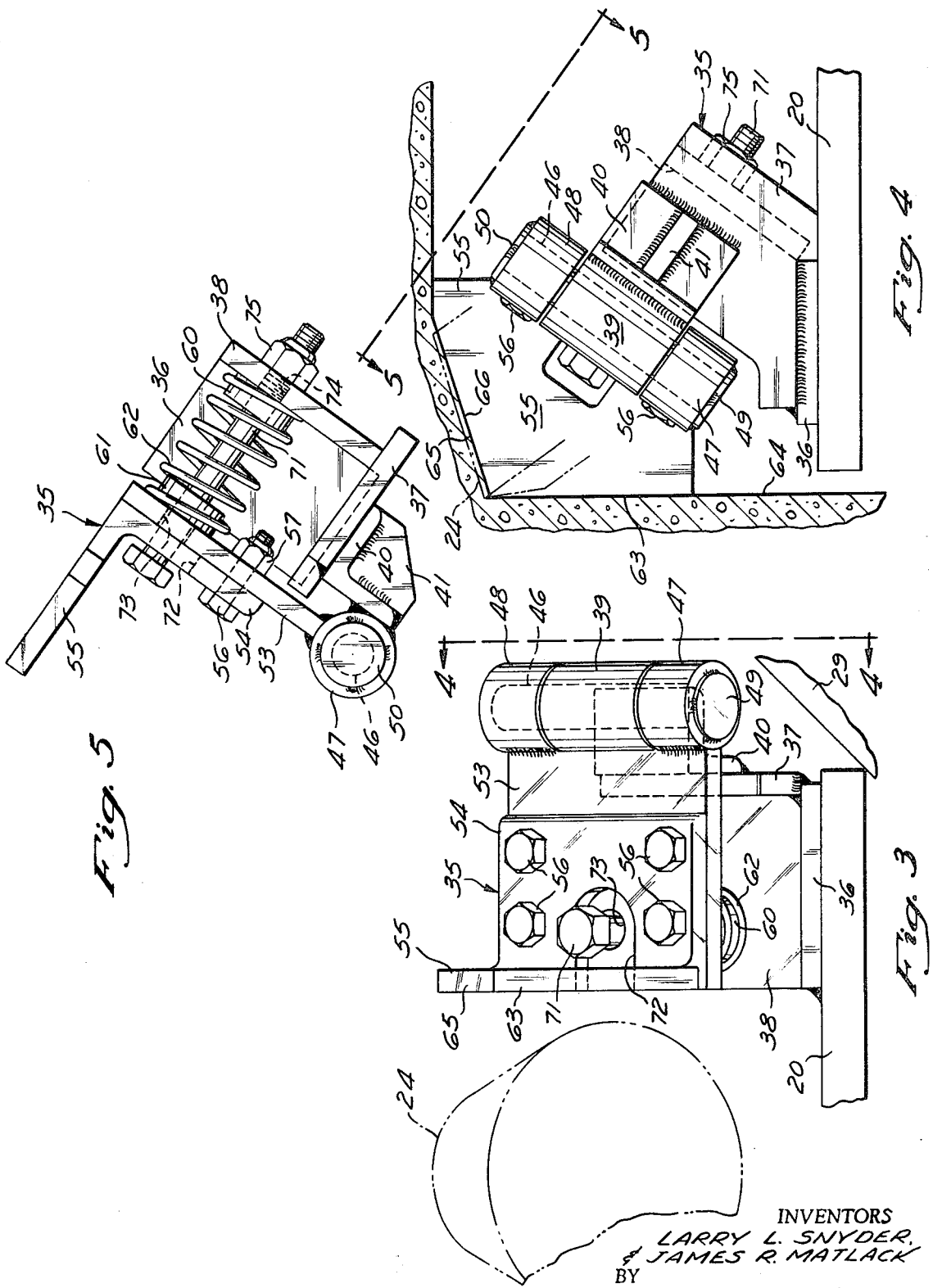

GAGE SCRAPER

BACKGROUND OF THE INVENTION

This invention relates generally to tunneling machines, and more particularly to tunneling machines having a rotatable cutter head and roller cutters mounted on the cutter head for engaging an end face of a tunnel with rolling contact. More particularly, the invention relates to a scraper for clearing materials from the path of such roller cutters.

Tunneling machines generally include a support frame which is anchored in the tunnel and which supports a rotatable cutter head. Roller cutters are mounted on the cutter head, and rotation of the cutter head causes the cutters to travel about the end face of the tunnel with rolling contact to cut or crush the formation encountered in a well known manner. The roller cutters include inside cutters and cutters which travel about the radially outermost portion of the tunnel end face adjacent the cylindrical tunnel wall, the latter of which are known as gage cutters.

Because of their location, the gage cutters tend to be the most critical with respect to wear and durability. These cutters travel the greatest distance, and particularly at the bottom of the tunnel face they are the most likely to encounter formation particles on the end face and the side wall which produce excessively high compression forces tending to damage and shorten the life of the cutters. The copending application of Joseph V. Scaravilli, Ser. No. 1,079, filed Jan. 7, 1970, now U.S. Pat. No. 3,674,314 teaches a solution to this problem by the provision of a gage scraper in the form of a blade resiliently mounted on the cutter head assembly slightly in advance of each gage scraper to bear against both the tunnel end face and the side wall to scrape and dig loosened particles from the tunnel surfaces so that they will not be encountered by the gage scraper.

Although such prior art gage scrapers have been successfully employed, they are nevertheless subject to certain disadvantages. If any one of the gage scrapers associated with one of the gage cutters is damaged or excessively worn so that it requires replacement, it may be necessary to move the scraper away from the tunnel surface which it engages to relieve the biasing force exerted on the scraper blade portion. This may be particularly difficult when one part of the scraper blade engages the tunnel end face and another part of the scraper blade engages the cylindrical tunnel wall.

Another problem with such prior art gage scrapers may occur when the gage scraper encounters a void in the formation that is being cut. When this happens, the compressed spring means may force the scraper blade into the void so that it will be damaged when solid formation particles are subsequently reached.

SUMMARY OF THE INVENTION

These and other problems and disadvantages of prior art scrapers are overcome by the present invention, which provides a tunneling machine having a roller cutter mounted on a rotatable cutter head for engaging an end face of a tunnel with rolling contact. A scraper leads the roller cutter for clearing materials from its path. The scraper includes a mounting means secured to the cutter head and a movable portion having a mounting portion movably secured to the mounting means and a blade member detachably secured to the mounting portion. A biasing means urges the blade member toward the tunnel face. A stop means limits the travel of the blade member toward the tunnel face. In this manner, the stop means may prevent the blade member from entering a void in the tunnel face and/or may move the blade member away from the tunnel face to permit its removal.

In the preferred embodiment, the stop means includes a force applying surface means which engages the mounting portion to displace the movable portion away from the tunnel surface. Since the force is applied to the mounting portion, the scraper blade member may be easily removed once it has been moved to a position away from the tunnel surface. The biasing means includes a coil spring, and the force applying surface is the head of a bolt. The bolt extends axially through the coil spring to provide a balanced compression force on the coil spring when the movable portion is displaced away from the tunnel surface. The bolt head is normally disposed in the path of the movable portion between the movable portion and the tunnel surface to provide an adjustable stop means for precluding movement toward the tunnel surface when the scraper encounters voids or soft portions of the tunnel surface which it normally engages.

In the preferred embodiment, the mounting means includes a pivot means for defining an arcuate path of travel of the movable portion toward and away from the tunnel surface. In this manner, deflection of the movable portion away from the tunnel surface when a formation is encountered which the scraper cannot remove will have a tangential component of movement relative to the rotatable cutter head as well as a radial component of movement relative to the cutter head to permit a smooth swinging movement from the tunnel surface.

BRIEF DESCRIPTION OF THE DRAWINGS

These and other aspects and advantages of the invention will become apparent to those skilled in the art upon an understanding of the preferred embodiment of the invention shown in the accompanying drawings, wherein:

FIG. 1 is a schematic perspective view of a tunneling machine according to the principles of the invention, portions of which are shown in phantom;

FIG. 2 is an enlarged exploded perspective view of a gage scraper used on the tunneling machine shown in FIG. 1, with portions removed for clarity;

FIG. 3 is an enlarged side elevational view of the gage scraper used on the tunneling machine shown in FIG. 1;

FIG. 4 is an elevational view of the gage scraper taken along reference view 4-4 in FIG. 3; and FIG. 5 is an elevational view of the gage scraper taken along reference view line 5-5 in FIG. 4.

DESCRIPTION OF THE PREFERRED EMBODIMENT

Referring now to the drawings in greater detail, FIG. 1 shows a tunneling machine of the type disclosed in U.S. Pat. No. 3,383,138 to Victor J. Scaravilli et al. The tunneling machine includes a support frame 10 which is braced against the cylindrical tunnel wall by hydraulically actuated forward holding feet 11 and hydraulically actuated rearward holding feet 12 to position the machine in proper alignment and absorb torque produced by the machine. A movable carriage frame (not shown) is carried on the support frame by articulated torque arms (not shown) so that the movable carriage frame may be displaced axially relative to the support frame 10 by push cylinders (not shown) which act between the support frame 10 and the movable carriage frame. Drive motors 13, only one of which can be seen in FIG. 1, are mounted on the rearward portion of the movable carriage frame and provide the power for driving a central drive shaft through gears contained in the gear housing 14. However, it is understood that this invention can be applied to any machine having roller cutters, and the foregoing description of a particular machine has been for purposes of illustration.

Rotatably journaled on the forward end of the movable carriage frame and driven by the central drive shaft is a rotatable cutter head 20. A plurality of inside saddles 21 are located in predetermined positions on the forward end face of the cutter head 20 by locating dowel pins (not shown) and welded to the cutter head 20. Each inside saddle 21 carries an inside roller cutter 22. In a similar manner, three gage saddles 23 are located in predetermined positions on the front face of the cutter head 20 by locating dowel pins (not shown) and suitably welded to the cutter head. A gage roller cutter 24 is rotatably journaled in a suitable manner to each of the gage saddles 23. In the preferred embodiment, the gage saddles 23 support the gage cutters 24 in which a manner that the axis of rotation 25 of the gage cutters 24 is at an angle to the axis of rotation of the inside cutters 22, so that the tunnel end face is provided with a slightly relieved portion adjacent the cylindrical tunnel wall.

The inside cutters 22 and the gage cutters 24 may be of any desired type and are chosen in a well known manner. For example, when tooth type cutters are to be used and soft formations such as clay and soft shale are expected to be encountered, the cutters must have teeth large enough to produce a gouging action in the formation. Tooth type cutters for medium hard formations such as limestone and sandstone must have a larger number of slightly smaller teeth to prevent breakage. For extremely hard igneous formations such as diorite, granite, quartzite or basalt, tooth type cutters having individually mounted tungsten carbide inserts in the cutting face may be used. If desired, a circumferential tooth, kerf type cutter may be used for a wide range of soft to medium hard formations. The principles of the invention may be practiced regardless of the type of roller cutter used.

When the hydraulically actuated holding feet 11 and 12 are extended radially outwardly to grip the cylindrical wall of the tunnel and prevent movement of the support frame 10 relative thereto, the drive motors 13 are actuated to rotate the cutter head 20 in the clockwise direction as viewed from the rearward portion of the tunneling machine facing forwardly. As the cutter head 20 rotates, suitable push cylinders (not shown) advance the movable carriage frame (not shown) axially forwardly to force the roller cutters 22 and 24 against the tunnel end face with rolling contact to cut or crush the formation being encountered. A liquid drilling fluid is supplied to remove the formation particles that have been cut or crushed from the tunnel end face. This prevents the formation particles from being recut by the roller cutters, and prevents the formation particles from accumulating between the saddles and the cutters to reduce the possibility of clogging the cutters and to reduce the possibility of any of the cutters ceasing to rotate and being worn by skidding about the tunnel end face. This liquid drilling fluid accumulates in the bottom of the tunnel bore, and muck deflectors 29 deflect this accumulation of formation particles and drilling fluid into muck buckets 30 as the cutter head 20 rotates. A muck ring 31 is rigidly mounted on the support frame 10 and provides one wall for each bucket 30. As each bucket 30 rotates from the lower portion of the tunnel to the upper portion of the tunnel, it reaches the end of the ring 31 so that the contents of the bucket are dropped onto a conveyor (not shown) which is mounted on top of the tunneling machine to convey the material to the rear of the machine.

A gage scraper 35 is provided to clear materials from the path of each gage cutter 24 which are not removed by the muck buckets 30 to preclude damage to the gage cutters 24 from formation particles which project from the end of the tunnel or from the cylindrical tunnel wall. As will become more readily apparent hereinafter, a scraper 35 according to the principles of this invention may also be used in cooperative relationship with an inside cutter 22 if desired.

Each gage scraper assembly 35 includes a first mounting plate 36 welded to the cutter head 20 immediately adjacent the gage saddle 23. A first side support plate 37 is welded to the leading edge of mounting plate 36, and a second side support plate 38 is welded to the radially inwardmost edge of the mounting plate 36.

The side support plate 37 carries a first pivotal mounting member 39. An angle brace member 40 is welded to the side support plate 37. A reinforcing member 41 is welded to the angle brace member 40 to provide additional strength and support, and the pivotal mounting member 39 is welded directly to the angle brace member 40.

A movable portion of the gage scraper assembly 35 is pivotally secured to the first pivotal mounting member 39. The movable portion includes second and third pivotal mounting members 47 and 48 which are pivotally connected to the first pivotal mounting member 39 by a pivot pin 46. After the mounting members 47 and 48 have been positioned and the pivot pin 46 installed, end caps 49 and 50 are welded to the second and third mounting members 47 and 48, respectively, to remain the pivot pin 46 in the position shown in the drawings. The movable portion of the scraper assembly 35 further includes a movable mounting plate 53 welded to the second and third mounting members 47 and 48. A removable scraper blade having an arm portion 54 and a scraper blade portion 55 is secured to the mounting plate 53 by bolts 56. The bolts 56 extend through suitable holes in the arm portion 54 and the mounting plate 53 and are threadably received by nuts 57.

A first tubular spring retainer 60 is welded to the side support plate 38, and a second tubular spring retainer 61 is welded to the movable mounting plate 53. A coil spring 62 extends between the side support plate 38 and the movable mounting plate 53 and is kept in position by the spring retainers 60 and 61.

When the rotatable cutter head 20 is rotated as described above, the coil spring 62 biases a first scraper edge 63 of the scraper blade portion 55 against the cylindrical tunnel wall 64 and a second scraper edge 65 against the tunnel end face 66. In the preferred embodiment, the spring 62 has a spring rate of about 200 pounds per inch and is compressed about one inch so that the blade portion 55 is biased against the tunnel surface with a force of about 200 pounds. If a formation particle is encountered which the scraper blade 55 cannot remove, the movable portion of the scraper assembly 35 will be displaced away from the tunnel surfaces against the bias of the coil spring 62 to prevent damage to the scraper. Because the movable portions of the scraper 35 are pivotally mounted for movement about an arcuate path, the movable portions will have a tangential component of movement as well as a radial component of movement to provide a smooth swinging movement away from the tunnel surfaces.

As best seen in FIG. 4, the longitudinal axis of the pivot pin 46 is disposed in a plane substantially perpendicular to the tunnel surfaces 64 and 66. This insures that the scraper blade portion 55 will be deflected away from both of the tunnel surfaces 64 and 66 without any binding against one of the surfaces. Furthermore, the scraper blade portion 55 is disposed in a plane which is in nonintersecting relation to the pivot pin 46. This permits the blade portion 55 to be arranged substantially perpendicular to the tunnel surfaces 64 and 66 while permitting the spring 62 to bias the blade portion 55 radially outwardly against the tunnel surfaces.

To limit the outward travel of the scraper blade portion 55 when a void is encountered, and to move the scraper blade portion 55 away from its associated tunnel surface to permit removal, a stop means is disposed in the arcuate path of the movable portion of the scraper assembly 35. In the preferred embodiment, this stop means includes a bolt 71 extending through an enlarged cut-out passage 72 of the arm portion 54 and through a smaller passage 73 in the movable mounting plate 53. The bolt 71 extends through the center of coil spring 62 and is threadably received by a suitable threaded hole 74 in the side support plate 38. A lock nut 75 locks the bolt 71 in the position shown in the drawings.

As best seen in FIGS. 3 and 5, the head portion of the bolt 71 may be received within the cut-out portion 72, but is not small enough to pass through the smaller diameter passage 73. When the tunneling machine is being operated as described above and a void is encountered in the tunnel surface adjacent the scraper assembly 35, the coil spring 62 will force the movable portion of the scraper assembly outwardly away from the cutter head 20 along its arcuate path. However, this outward movement is limited by the head of the volt 71 contacting the mounting plate 53 intermediately adjacent the smaller diameter passage 73. In this manner, the bolt 71 provides a stop to limit the travel of the movable portion of the scraper assembly toward the tunnel surface. The maximum outward position of the movable portion may be changed, if desired, by screwing the bolt 71 into or out of the threaded hole 74.

The bolt 71 further provides a release means to move the movable portion of the scraper assembly 35 away from the tunnel surface along its arcuate path. This disengages the scraper blade portion 55 from the tunnel surface to permit removal and replacement when the scraper blade portion 55 becomes worn or damaged. When the bolt 71 is threaded further into the threaded hole 74, the head of the bolt is received within the cut-out portion 72 and engages the movable mounting plate 53 immediately adjacent the smaller diameter passage 73. Further tightening of the bolt 71 displaces the movable mounting plate 53 to move the scraper blade portion 55 away from the tunnel surfaces 64 and 66 and to compress the coil spring 62. The mounting bolts 56 may then be removed to remove the scraper blade portion 55 from the movable mounting plate 53. If may be understood that the bolt 71 acts as a mechanical force multiplying device. The head of the bolt 71 provides a force receiving portion, and the threaded end portion of the bolt 71 provides a force multiplying means. The multiplied force is then applied to the movable portion by the lower surface of the bolt head. Because the lower surface of the head of the bolt 71 acts directly on the movable mounting plate 53, it does not interfer with removal of the scraper blade portion 55 from the mounting plate 53. Once a new scraper blade portion has been installed, the bolt 71 is loosened and is locked in the position shown in the drawings by lock nut 75 to provide a stop means as described above.

Although a specific embodiment of the invention has been shown and described in detail, various modifications or additions may be made without departing from the scope of the invention as defined by the following claims.

We claim:

1. In a cutter head for a tunnelling machine having a plurality of roller type cutters including at least one gage cutter mounted on the cutter head, said cutter head being constructed and arranged to bore a tunnel by rotational movement of the cutter head about a tunnel surface including an end face and a side wall with said gage cutter engaging said tunnel surface at a zone adjacent the intersection of said end face and said side wall, and a gage scraper mounted on said cutter head on the leading side of said gage cutter adjacent said end face and said wall, the improvement in said gage scraper comprising a mounting means secured to said cutter head, a movable mounting plate movably secured to said cutter head by said mounting means for movement along a path to and from said tunnel surface, a detachable blade member, means for detachably securing said blade member to said mounting plate for movement with said mounting plate to and from said tunnel surface, resilient means acting against said mounting plate for biasing said mounting plate and said blade member toward said tunnel surface, and release means fixedly secured to said cutter head for positively pulling said mounting plate toward said cutter head against the bias of said resilient means to move said blade member away from said tunnel surface whereby said detachable blade member may be detached from said support plate.

2. A cutter head as set forth in claim 1 wherein said release means includes a force receiving portion disposed on said mounting plate, a force multiplying means for increasing the force applied to said force receiving portion, and a force applying portion for engaging said mounting plate and applying said multiplied force to said mounting plate.

3. A cutter head as set forth in claim 1 wherein said resilient means includes a coil spring, said release means includes a threaded rod extending through said coil spring between said mounting plate and said cutter head, and said threaded rod is slidably disposed in a passage in said mounting plate and is fixedly disposed on said cutter head.

4. A cutter head as set forth in claim 1 wherein said blade member is disposed in a plane, said mounting means includes hinge means spaced from said plane for mounting said mounting plate whereby said path is an arcuate path, said hinge means includes a pivotal axis, and said pivotal axis extends in a direction substantially perpendicular to the rotational direction of travel of said cutter head.

5. A cutter head as set forth in claim 1 wherein said release means includes a stop member disposed in said path of said mounting plate for limiting travel of said mounting plate and said blade member away from said cutter head toward said tunnel surface.

6. A cutter head as set forth in claim 5 wherein said stop member is spaced away from said mounting plate, and said stop member includes surface means for engaging said mounting plate and for defining the outermost portion of said mounting plate away from said cutter head toward said tunnel face.

7. A cutter head as set forth in claim 6 including means for adjustably positioning said stop member for varying said outermost position.

8. A cutter head as set forth in claim 5 wherein said stop member is normally disposed in said path of movement of said mounting plate between an advanced position and said tunnel surface for limiting said movement of said mounting plate from said advanced position toward said tunnel surface.

9. A tunnelling machine comprising a rotatable cutter head, a roller cutter mounted on said cutter head for engaging an end face of a tunnel with rolling contact, a scraper leading said roller cutter for clearing materials from the path of said roller cutter, said scraper including a movable portion and a mounting means, means for biasing said movable portion toward an advanced position adjacent a tunnel surface, said movable portion including a blade portion disposed in a plane, said mounting means including pivot means spaced from said plane for defining an arcuate path of travel of said movable portion toward and away from said tunnel surface, said pivot means including a pivotal axis, and said pivotal axis extending in a direction substantially perpendicular to the rotational direction of travel of said cutter head.

10. A tunnelling machine as set forth in claim 9 wherein said movable portion includes a mounting portion, said blade portion is detachably secured to said mounting portion, and release means moves said movable portion along said arcuate path away from said tunnel surface against the bias of said biasing means to permit removal of said blade portion.

11. A tunnelling machine as set forth in claim 9 including stop means for preventing movement of said movable portion along said arcuate path away from said cutter head beyond a predetermined maximum outward position.

12. A tunnelling machine as set forth in claim 9 wherein said pivotal axis is disposed in a plane substantially perpendicular to said tunnel surface.

13. A tunnelling machine as set forth in claim 9 wherein said pivotal axis is substantially parallel to said plane of said blade portion.

* * * * *